US012386418B2

(12) United States Patent
Vertegaal et al.

(10) Patent No.: US 12,386,418 B2
(45) Date of Patent: Aug. 12, 2025

(54) GAZE ASSISTED INPUT FOR AN ELECTRONIC DEVICE

(71) Applicants: Roeland Petrus Hubertus Vertegaal, Perth Road Village (CA); Sean Brian Braley, Orillia (CA)

(72) Inventors: Roeland Petrus Hubertus Vertegaal, Perth Road Village (CA); Sean Brian Braley, Orillia (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/464,007

(22) Filed: Sep. 8, 2023

(65) Prior Publication Data
US 2025/0085774 A1    Mar. 13, 2025

(51) Int. Cl.
| | | |
|---|---|---|
| *G06F 3/01* | (2006.01) | |
| *G06F 3/16* | (2006.01) | |
| *G10L 15/18* | (2013.01) | |
| *G10L 15/22* | (2006.01) | |
| *G10L 15/30* | (2013.01) | |

(52) U.S. Cl.
CPC ............. *G06F 3/013* (2013.01); *G06F 3/167* (2013.01); *G10L 15/1815* (2013.01); *G10L 15/22* (2013.01); *G10L 15/30* (2013.01); *G10L 2015/223* (2013.01)

(58) Field of Classification Search
CPC ..... G06F 3/013; G06F 3/167; G10L 15/1815; G10L 15/22; G10L 15/30; G10L 2015/223
See application file for complete search history.

(56) References Cited

U.S. PATENT DOCUMENTS

| | | | |
|---|---|---|---|
| 5,850,211 A | 12/1998 | Tognazzini | |
| 6,152,563 A | 11/2000 | Hutchinson | |
| 9,583,105 B2 * | 2/2017 | Stolcke | H04N 7/183 |
| 10,373,617 B2 | 8/2019 | Piernot | |
| 10,392,960 B2 | 8/2019 | Hunter | |
| 2013/0135196 A1 | 5/2013 | Park | |
| 2018/0307303 A1 * | 10/2018 | Powderly | G06F 3/013 |
| 2019/0333508 A1 * | 10/2019 | Rao | G10L 15/25 |
| 2021/0124416 A1 * | 4/2021 | Sarkar | G02B 26/101 |
| 2022/0391012 A1 | 12/2022 | Vertegaal | |

FOREIGN PATENT DOCUMENTS

| | | | |
|---|---|---|---|
| CN | 110785688 A | 2/2020 | |
| EP | 2600220 B1 | 6/2013 | |
| WO | WO-2023034497 A2 * | 3/2023 | G06F 3/013 |

OTHER PUBLICATIONS

Jacob, Robert J.K. "The Use of Eye Movements in Human-Computer Interaction Techniques: What You Look At is What You Get". ACM Transactions on Information Systems vol. 9, No. 3 Apr. 3, 1991.
A. M. Penkar, C. Lutteroth, and G. Weber. Designing for the eye: design parameters for dwell in gaze interaction. In Proceedings of the 24th Australian Computer-Human Interaction Conference (OzCHI '12). Association for Computing Machinery, New York, NY, USA 2012.

* cited by examiner

*Primary Examiner* — Kenneth B Lee, Jr.

(57) ABSTRACT

A computer implemented method and system for gaze-assisted input that includes displaying a plurality of display elements in a display space, tracking a user's point of gaze within the display space, receiving a speech input, identifying one of the plurality of display elements as a subject display element for the speech input based on the tracking, and automatically performing an action based on the subject display element and the speech input.

20 Claims, 8 Drawing Sheets

GAZE ASSISTED INPUT FOR AN ELECTRONIC DEVICE

CROSS-REFERENCE TO RELATED APPLICATIONS

This is the first application for this disclosure.

BACKGROUND

A person's eye movement is closely linked to his or her attention, behavior and cognition. Gaze estimation, a computer vision task which locates what a person is looking at, has received significant interest in recent years. Gaze estimation has been widely applied, especially in human-computer interaction. State-of-the-art gaze estimation can achieve high accuracy and precision (with angular error about 1°)

Gaze estimation can, for example, be applied to estimate an (2D) x,y coordinate of a display as the location of a user's gaze, with the estimated location used as a basis for a user input. Typically, gaze estimation input for user interface applications require some bounding rectangle, such as a window, button or icon to be displayed on the screen of a device. In early applications, such devices were typically computer monitors, but more recently mobile devices, tablets, and AR/VR headsets also feature eye tracking.

One class of scenarios for gaze estimation input in user interfaces is analogous to the point and click of a mouse, or touch of a finger on a touchscreen: a (calibrated) x,y coordinate is obtained from an eye tracker and made relative to a current screen or window. This coordinate is then mapped within a representation of the interactive element, for example a button. One of the problems of gaze estimation based point and click solutions is knowing when the user would like to execute a click (e.g., trigger a functionality associated with a region of interest). Several methods have been proposed to simulate the click of a mouse with the eyes, including the use of blinks (which is inadvisable because it involves closing the eye).

Another method involves the trigger of the functionality after a defined gaze dwell time. Programmatically, a dwell time period is defined that determines how long the user must look at a region of interest for an action to take place. After expiry of the dwell time, a trigger associated with the functionality of the interactive element sends an event to a user interface (UI) event processing loop, which executes a method or function to execute the associated functionality. During the dwell time, an animation may provide feedback to the user that they are about to trigger the functionality associated with the region of interest.

The problem with the use of dwell time is that if it is too short, the system would be overly responsive, producing a click every time the user looks at a region of interest. However, if the dwell time is too long, the system appears unresponsive.

A similar point and click scenario can be played out in AR/VR applications. Here, the 2D coordinate of a gaze estimation input is matched to a 3D object displayed on a head mounted display (HMD). This object can then, after a defined gaze dwell time, trigger some kind of action in the virtual environment.

A second method for detecting a "click input" is to have some other modality provide the click that triggers functionality. This other modality can take the shape of a physical button. Here, the user looks at the region of interest, and then presses a key on a keyboard or remote control.

In the context of smart phones and tablet devices, gaze estimation has typically been limited to determining if a user is looking at a display or not, rather than any particular region of interest of the display.

There is a need for improved gaze estimation solutions that can be applied to commonly available hardware devices.

BRIEF SUMMARY

According to example implementations, the present disclosure describes a number of user interface techniques that utilize eye input in the form of an x,y Point-of-Gaze coordinate (POG) to trigger functionality on an electronic device. Processes to disambiguate between intentional and non-intentional voice commands by redundant coding of the command in the label of the user interface element are also disclosed.

According to a first example aspect, a computer implemented method is disclosed that includes: displaying a plurality of display elements in a display space; tracking a user's point of gaze within the display space; receiving a speech input; identifying one of the plurality of display elements as a subject display element for the speech input based on the tracking; and automatically performing an action based on the subject display element and the speech input.

In some examples, tracking the user's point of gaze comprises determining coordinates for the user's point of gaze within a coordinate system of the display space.

In one or more of the preceding examples, a gaze region is determined within the display space based on the determined coordinates for the user's point of gaze, wherein the gaze region encompasses the user's point of gaze and a surrounding region of the display space.

In one or more of the preceding examples, identifying the subject display element is based on a predetermined minimum threshold spatial overlap between the gaze region and a sub-region of the display space occupied by the subject display element for a predetermined minimum threshold time of the speech input.

In one or more of the preceding examples, the method is performed by a first electronic device and the subject display element is a GUI element that represents a further device that is associated with the first electronic device, the method including: extracting a command from the speech input, and automatically performing the action comprises transmitting the command, using a network interface of the first electronic device, for processing by the further device.

In one or more of the preceding examples, the method includes causing the GUI element to move in the display space in response to motion of one or both of the further device or the first electronic device.

In one or more of the preceding examples, the subject display element corresponds to an application, and the method includes: extracting text from the speech input, and wherein automatically performing the action includes providing the extracted text for processing by the application.

In one or more of the preceding examples, the subject display element corresponds to a remotely hosted service, and the method includes: extracting a text search query or text prompt from the speech input, and automatically performing the action includes automatically providing the extracted text search query or text prompt via a communication network to the remotely hosted service and receiving a corresponding response from the remotely hosted service.

In one or more of the preceding examples, the subject display element corresponds to a word displayed in a text display field, and the method includes: extracting a replacement word from the speech input, and wherein automatically performing the action comprises replacing the word displayed in the text display field with the replacement word or phrase.

In one or more of the preceding examples, subject display element includes indicia indicating a meaning, and the method includes extracting a command from the speech input, and automatically performing the action includes comparing the extracted command to the meaning indicated by the indicia and causing an activity corresponding to the extracted command to be performed only when the extracted command matches the meaning indicated by the indicia.

According to a further example aspect is a computing system that includes one or more processors; and one or more memories storing instructions that, when executed by the one or more processors, configure the computing system to perform any one of the methods of preceding examples.

According to a further example aspect is a non-transitory computer-readable storage medium, the computer-readable storage medium including instructions that when executed by a computing system, cause the computing system to perform any one of the methods of preceding examples.

According to a further example aspect is a computer program product that stores instructions that when executed by a computing system, cause the computing system to perform any one of the methods of preceding examples.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example embodiments will now be described more fully hereinafter with reference to the accompanying drawings. The features and aspects presented in this disclosure may be embodied in many different forms and should not be construed as limited to the embodiments set forth herein. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, statements that a second item (e.g., a signal, value, process, operation, or action) is "based on" a first item can mean that characteristics of the second item are affected or determined at least in part by characteristics of the first item. The first item can be considered an input to an operation or process, or a series of operations or processes that produces the second item as an output that is not independent from the first item.

Figure 1:
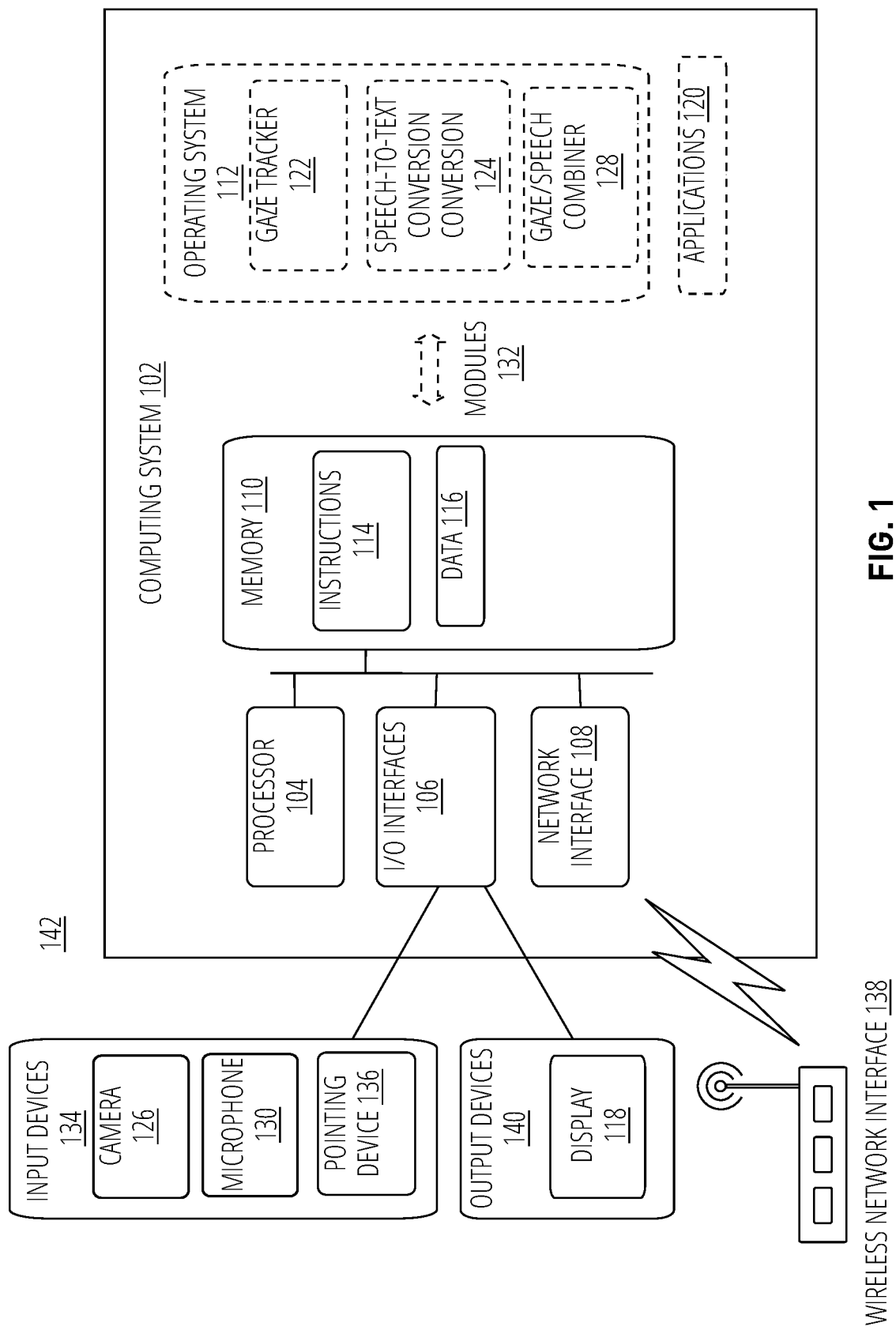
FIG. 1 is a block diagram illustrating an example of an apparatus which may be used to implement examples of the present disclosure.

FIG. 1 is a block diagram illustrating a simplified example implementation of an Apparatus 142 that includes a computing system 100 and related components that are suitable for implementing embodiments described herein. For example, Apparatus 142 can be used in some examples to implement the Electronic device 204 described below. Examples of the present disclosure may be implemented in other computing systems, which may include components different from those discussed below.

Although FIG. 1 shows a single instance of each component, there may be multiple instances of each component in the computing system 100. Further, although the computing system 100 is illustrated as a single block, the computing system 100 may be a single physical machine or electronic device (e.g., implemented as a single computing device, such as a single workstation, single end user device, single server, etc.), and may include mobile communications devices (smartphones), laptop computers, tablets, desktop computers, vehicle driver assistance systems, smart appliances, wearable devices, assistive technology devices, virtual reality devices, augmented reality devices, Internet of Things (IoT) devices and interactive kiosks, among others.

Computing System 102 includes at least one Processor 104, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include one or more input/output (I/O) Interfaces 106, which may enable interfacing with Input Devices 134 and/or Output Devices 140. In the example shown, the Input Devices 134 can include devices requiring physical user contact (e.g., a keyboard, a touchscreen, a keypad, and a Pointing Device 136. In the present disclosure, a "pointing device" can refer to: a human-computer interface device that enables a user to input spatial data to a computer. In examples, a pointing device may be a handheld input device, including a mouse, a touch pad, a touch screen, a stylus, a joystick, or a trackball, among others. In examples, a pointing device may be used to control a cursor or a pointer in a graphical user interface (GUI) for pointing, moving or selecting displayed GUI elements such as text or objects on a display, among others. In examples, spatial data may be continuous and/or multi-dimensional data.

Input Devices 134 can also include contactless input devices that do not require physical user contact to effect user input such as a Camera 126 and Microphone 130. In the present disclosure, contact-free input or contactless input can refer to a user input to an electronic device that does not require a user to physically interact with a pointing device to select a display element (e.g., a contact-free input can be, but is not limited to a voice command, a mid-air gesture or body movement, inertial measurement unit (IMU) based tracking of overall motion of a device.)

In the example shown, the Output Devices 140 can include a Display 118, among other output devices (e.g., a speaker and/or a printer). In some example, some or all of Input Devices 134 and Output Devices 140 may be physically integrated into a common device with the Computing System 102, such as in the case of a smart phone. In other examples, some or all of Input Devices 134 and Output Devices 140 can be housed separately from components of Computing System 102. For example, Computing System 102 could comprise a video streaming box, connected to a video projector that projects images onto a passive Display 118, with Camera 126 positioned adjacent to and facing outward from the Display 118.

The computing system 100 may include one or more Network Interfaces 108 for wired or wireless communication with other computing systems (e.g., other computing systems in a network connected via a Wireless Network Interface 138). The Network Interfaces 108 may include interfaces for wired links (e.g., Ethernet cable) and/or wireless links (e.g., WiFi, Bluetooth, Cellular Data Networks) for intra-network and/or inter-network communications.

The computing system 100 includes one or more Memories 110 (collectively referred to as "Memory 110"), which may include a volatile or non-volatile memory (e.g., a flash memory, a random access memory (RAM), and/or a read-only memory (ROM)). The non-transitory Memory 110 may store software in the form of Instructions 114 for execution by the Computing System 102, along with supporting Data 116, such as to carry out examples described in the present disclosure. The Instructions 114 can include instructions for implementing an Operating System 112 and other Applications 120 or functions. In the illustrated example, the Operating System 112 includes Modules 132 that are used to process user inputs and route instructions based on such inputs to appropriate Applications 120. In the present disclosure, a "module" can refer to can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. In some examples, "module" can refer to a hardware processing circuit that is configured to perform a specific function. For example, Modules 132 can include modules for implementing a gaze assisted inputs according to the present disclosure, for example, Gaze Tracker 122, Speech-To-Text Conversion 124 and Gaze/Speech Combiner 128

In some examples, the Computing System 102 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 120 to implement data storage, retrieval, and caching functions of the Computing System 102. The components of the computing system 100 may communicate with each other via a bus, for example.

Figure 2:
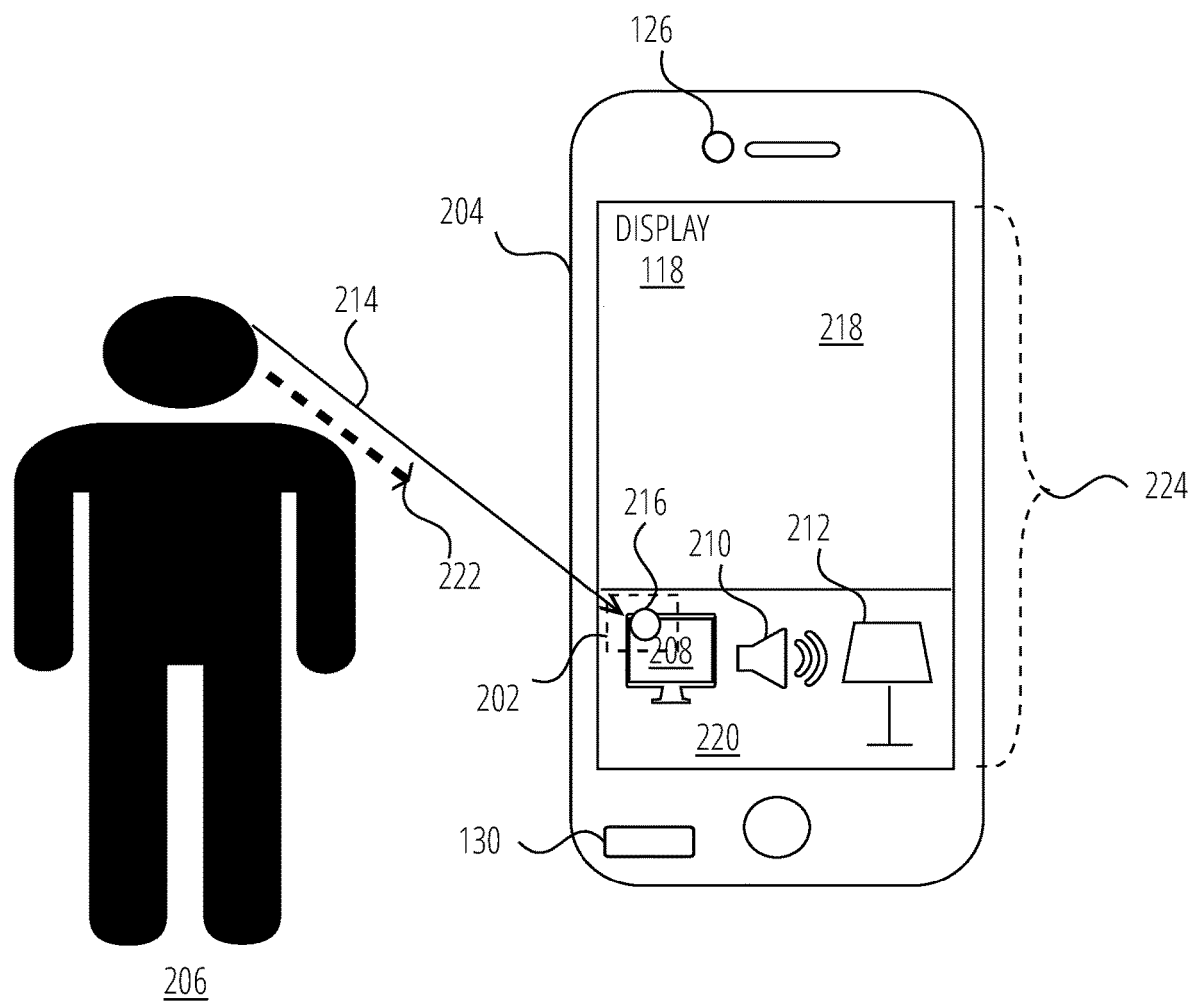
FIG. 2 illustrates an example of a gaze-assisted input event for directing a speech input to a remote device that is represented by a display element a display space of an electronic device in accordance with one embodiment.

FIG. 2 is a schematic diagram illustrating an example of gaze assisted input in the context of an Electronic device 204 according to an example implementation. In the example of FIG. 2, the Electronic device 204 is a processor enabled handheld device such as a smartphone having a Display 118, a Camera 126, and a Microphone 130. However, the gaze assisted input that is described could be applied to any number of different types of devices or combinations of devices, including but not limited to tablets, personal computers, laptops, televisions, augmented reality (AR)/virtual reality (VR) headsets, and smart glasses.

FIG. 2 shows a User 206 (not to scale) interacting with Electronic device 204. In the scenario where Electronic device 204 is a smartphone, the Electronic device 204 will be held in the user's hand and viewed by the User 206 with a Gaze Direction 214. As noted above in respect of FIG. 1, in example embodiments, Electronic device 204 is configured to implement Modules 132, namely Gaze Tracker 122, Speech-To-Text Conversion 124 and Gaze/Speech Combiner 128 modules, to enable gaze assisted input. By way of examples, these Modules 132 could be implemented by Operating System 112 to support a user interface (UI) event processing loop.

In the illustrated example, the Electronic device 204 has Display 118 integrated into a front surface of the device. The Display 118 provides a two dimensional display space 224 on which text and graphical display elements can be presented to User 206. In an example embodiment, the Gaze Tracker 122 performs an ongoing real-time gaze tracking function by repeatedly estimating a point of gaze (POG) 216 of User 206 that corresponds to a location within Display space 224. In example embodiments, gaze tracking is implemented using video-based eye tracking, for example, using Camera 126 to capture face or eye images of User 206 and computing a POG from the face or eye images. In the present disclosure, "point of gaze (POG)" can refer to a location within a display space 224 where an individual is looking. For example, the POG can refer to an intersection of a gaze vector (e.g., Gaze Direction) with a scene that is shown in the display space 224. In the case of a 2D display space 224, a POG may correspond to a location on a 2D display where a visual axis intersects the 2D display screen. In such examples, a POG within the display space 224 may be described by a set of 2D coordinates (x, y) corresponding to a position on the display, relative to a display coordinate system. In some examples, a display may display 3D images in a representation of a 3D display space 224. In such cases, the POG within the display space 224 may be described by a set of 3D coordinates (x,y,z) corresponding to a position in the 3D display space presented by the display.

In example embodiments, Gaze Tracker 122 can also be configured to compute, in real-time, a gaze region 202 based on the estimated user's Point of Gaze 216. For example, a gaze region 202 can be region of defined size that encompasses the Point of Gaze 216. For example, gaze region 202 could be a bounding box that encompasses a user's point of gaze, for example, with rectangular dimensions characterized by a width (w) and a height (h) and a center point (x, y) corresponding to the user's Point of Gaze 216. In this disclosure, "gaze data" can refer to real-time Point of Gaze information as well as location information (e.g., gaze region) that is determined based on the Point of Gaze. Although the real-time computed Point of Gaze 216 and gaze region 202 are represented by a circle outline and a dashed rectangle, respectively, in the Figures, in many typical use scenarios neither of these computed gaze data features will actually be displayed in display space 706.

Gaze Tracker 122 can be implemented using a number of different eye tracking solutions that performs gaze estimation, including for example a calibration-free solution such as that disclosed in United States Patent Publication No. US-2022-0391012-A1 (Vertegaal et al.), entitled SYSTEMS, METHODS, AND MEDIA FOR EYE TRACKING USING STATISTICALLY DERIVED LINEAR FUNCTIONS. Other possible eye tracking solutions that can be used to implement Gaze Tracker 122 may include, for example, solutions disclosed in U.S. Pat. No. 6,152,563 (Hutchinson et. al.).

Speech-To-Text Conversion 124 is configured to extract text from speech input that is received through a microphone (e.g., Microphone 130) and can be implemented using any number of suitable speech-to-text solutions. The extracted text can include commands, words or phrases in various examples.

Gaze/Speech Combiner 128 is configured to combine point-of-gaze based data from Gaze Tracker 122 and extracted text data from Speech-To-Text Conversion 124 to perform gaze-assisted input for Electronic device 204, examples of which are described in greater detail below.

In some examples, Gaze Tracker 122, Speech-To-Text Conversion 124 and Gaze/Speech Combiner 128 are all implemented as Modules 132 resident on Electronic device 204. However, in alternative embodiments, some or all of the functionality of these modules could be located on further electronic devices that communicate with Electronic device 204 through a Network Interface 108 or an I/O Interface 106. For example, Speech-To-Text Conversion 124 could be performed on a further device such as a smart watch, headphones, head mounted display or smart glasses that communicate the extracted text to Computing System 102 of Electronic device 204. Similarly, some or all of the functionality of Gaze Tracker 122 could be performed at a further camera enabled device that provides point-of-gaze based data to Computing System 102 of Electronic device 204.

In the example of FIG. 2, one or more of the Modules 132 cause an interactive graphical user interface (GUI) to be presented within the display space 224 provided by Display 118 of Electronic device 204. The displayed GUI can include multiple windows or panes, including for example a Main Pane 218 and a Control Pane 220. In the illustrated example, Control Pane 220 includes a set of display elements, for example, a Smart TV GUI element 208, a Smart Speaker GUI element 210, and a Smart Lamp GUI element 212. Each of these GUI elements occupies a respective sub-region of the Control Pane 220. Each GUI element represents a respective electronic device (for example a respective Internet of Things (IOT) device) that is connected to a common network (e.g., a smart home network) as the Electronic device 204. For example, each GUI element can represent a respective electronic device registered with a smart home network that is pre-associated with user's Electronic device 204. In the illustrated example, GUI elements 208, 210 and 212 are shown as graphical icons, however they can be any suitable 2D or 3D display element that is presented for viewing by User 206. The GUI elements 208, 210 and 212 are associated with one or application program interfaces (APIs) that enable the Electronic device 204 to be used as an interface that enables User 206 to provide commands or other voice inputs to the respective electronic devices that are represented by the GUI elements 208, 210 and 212. In example embodiments, the Electronic device 204 is configured to transmit commands that are detected via a UI event processing loop in respect of a GUI element 208, 210 or 212 to the respective IOT Device represented by the GUI element.

Electronic device 204 is configured to monitor for user input events that occur as a result of user interactions with the respective GUI elements 208, 210 or 212. In one example, a contactless input event will be determined to have occurred in respect of one of the GUI elements 208, 210 and 212 when a user's Point of Gaze 216 mapped to the GUI element coincides with a speech input 222 that includes content that is relevant to the IOT device that is represented by the respective GUI elements 208, 210 or 212. The Electronic device 204 is configured to perform an action in response to determining that a contactless input event has occurred, for example, route a command via Network Interface 108 for the subject IOT device.

In particular, in an example implementation, Gaze Tracker 122 generates real-time gaze data (e.g., estimated real-time User's 206 Point of Gaze 216 and/or corresponding gaze region 202 information). Simultaneously, Speech-To-Text Conversion 124 extracts text from any received user speech inputs 222. The extracted text and real-time gaze data are provided to Gaze/Speech Combiner 128 for processing. In an example implementations, Gaze/Speech Combiner 128 uses the gaze data to perform an on-going mapping function to identify which, if any, of the respective GUI elements 208, 210 and 212 is the subject of user's Gaze Direction 214 during a time duration that coincides with a received speech input. In some examples, the identification of the subject display element is based on predetermined minimum threshold spatial overlap and time overlap between the gaze region and a respective display space 224 sub-region of the subject display element during the time duration. For example, a 70% physical overlap in display space 224 between the gaze region 202 and the display space 224 sub-region occupied by a GUI element for at least 50% of the time duration of the speech input will result in identification of that particular GUI element as the subject display element. The Gaze/Speech Combiner 128 is configured to then cause one or more predefined actions to be taken based on the identified subject display element (e.g., GUI elements 208, 210 or 212) and a content of the speech input 222.

By way of example, in a possible scenario represented by FIG. 2, a Microphone 130 of the Electronic device 204 captures an audio input that includes a speech input (e.g., "go to channel 24") spoken by User 206. During a time duration that coincides (e.g., overlaps at least partially) with the speech input, the user's Gaze Direction 214 is focused on the Smart TV GUI element 208. Gaze/Speech Combiner 128 receives gaze data from the Gaze Tracker 122 and a text command "go to channel 24" that has been extracted from the content of the speech input by Speech-To-Text Conversion 124. Gaze/Speech Combiner 128 maps the gaze data to the display space 224 sub-region that is occupied by Smart TV GUI element 208, and furthermore, determines that the speech input for the command "go to channel 24" overlaps for a predefined time threshold with the mapping of the gaze data onto the Smart TV GUI element 208. Accordingly, Gaze/Speech Combiner 128 identifies Smart TV GUI element 208 as the subject of user's Gaze Direction 214 during the time duration that coincides with the received speech input. Based on this identification, Gaze/Speech Combiner 128 causes the Electronic device 204 to take one or more predefined actions, including sending a command "go to channel 24" via Network Interface 108 to the Smart TV that is represented by Smart TV GUI element 208.

In the above example, User 206 is able to direct a channel change command "go to channel 24" simply by looking at Smart TV GUI element 208 at the same time as speaking the command, without providing any further verbal or physical inputs. Gaze/Speech Combiner 128 automatically determines the target device for the command based on context provided by the User 204's Gaze Direction 214 coinciding with the speech input. The User 206 does not need to verbally specify which IoT device the voice command is intended for and does not need to physically interact with a Pointing Device 136.

Similarly, voice command content extracted from the speech inputs can be automatically routed to a smart speaker represented by Smart Speaker GUI element 208 (e.g., "play classical music" or "add pepper to my shopping list") or to a smart lamp represented by Smart Lamp GUI element 212 (e.g., "turn on from 7 PM until 11 PM tonight"), in response to User 206 gazing at the Smart Speaker GUI element 210 or Smart Lamp GUI element 212, respectively while uttering such commands.

In some examples, upon identifying that a particular display element is a subject display element, the Electronic device 204 could also visually highlight or otherwise visually indicate for a defined duration the particular display element to indicate that the gaze data has been mapped to the display element and the speech input for that display element is being acted upon.

Thus, in the example of FIG. 2, Point of Gaze 216 tracking is used to resolve which of a plurality of external IOT devices represented in a GUI or display space 224 are the target of a speech input 222. In at least some examples, the extracted content of the speech input can also be used to confirm the subject display element. For example, in some scenarios, if content extracted from the speech input is determined to be not suitable (e.g., out of context) for the display element that has been identified as the subject of a Point of Gaze 216, the Electronic device 204 can be configured to either ignore the speech input or, in some examples, to select an alternative display element as the subject display element for routing the command. For example, the display element next closest to the Point of Gaze 216 and that is a context match for the content of the speech input could be identified as the subject display element. By way of particular example, in the case of FIG. 2, a voice command speech input 222 "play classical music" coincident with Point of Gaze 216 being mapped to a left-edge of the Smart Lamp GUI element 212 could be re-mapped to Smart Speaker GUI element 210 upon a determination by Gaze/Speech Combiner 128 that the content extracted from the speech input 222 does not match a pre-defined set of commands suitable for the smart lamp but does match a further pre-defined set of commands suitable for a smart speaker.

FIGS. 3 to 6 illustrate further respective examples of gaze-assisted input tasks that can be performed according to example implementations of Electronic device 204.

Figure 3:
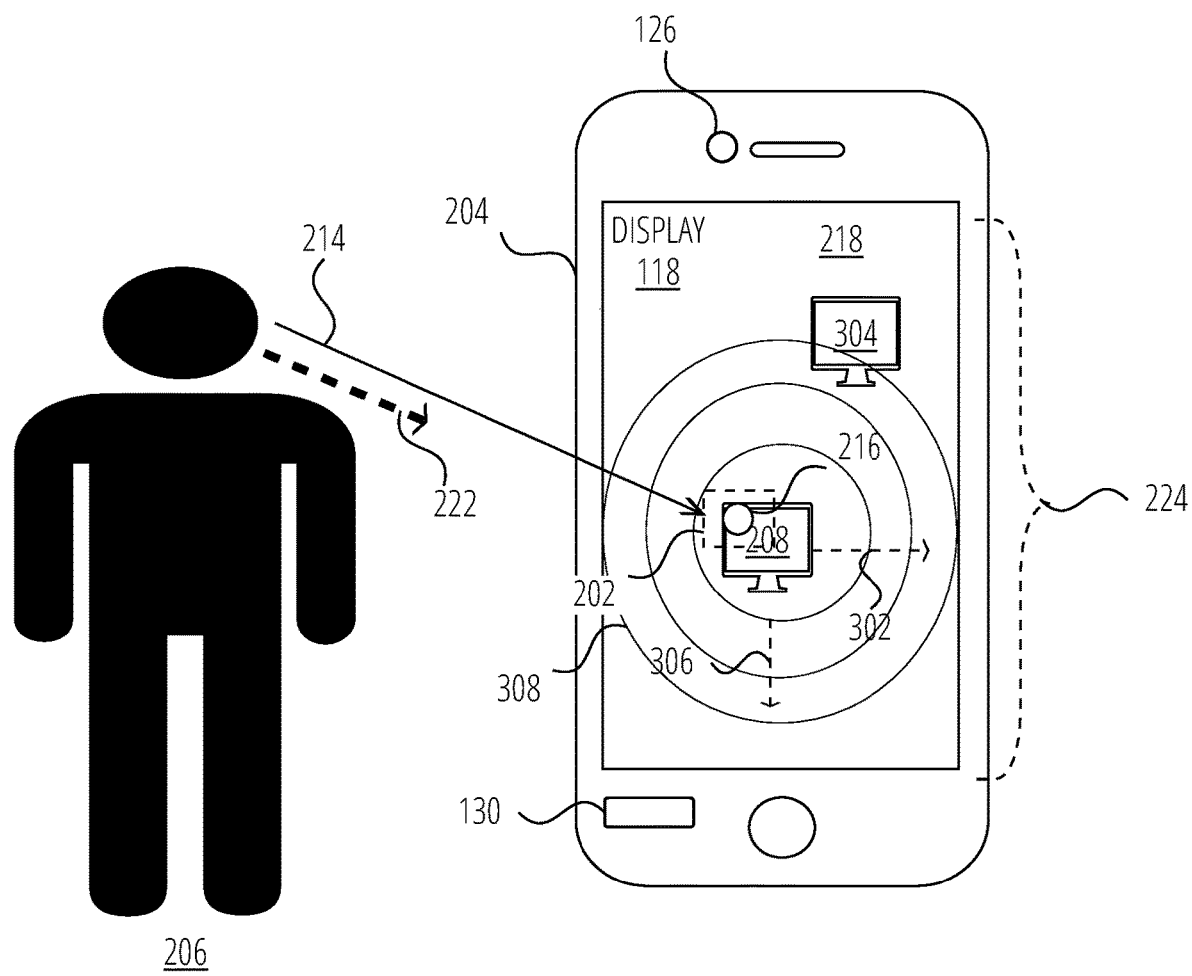
FIG. 3 illustrates an example of a gaze-assisted input event for directing a speech input to a remote device that is represented by a moving display element in a display space in accordance with one embodiment.

FIG. 3 illustrates an example that is similar to that of FIG. 2 except that in the case of FIG. 3, the GUI elements displayed in Display space 224 are dynamic elements that each move around in the Main Pane 218 of the display space 224 based on a location of the electronic devices that are represented by the GUI elements relative to the user's Electronic device 204. By way of example, in the scenario of FIG. 3, Smart TV GUI element 208 represents a first smart TV that is located in a fixed location and is registered with a smart home network pre-associated with user's Electronic device 204, and Smart TV GUI element 304 represents a second smart TV located in a second fixed location and is also registered with the smart home network. Operating System 112 (or a further Application 120) of Electronic device 204 is configured to use any suitable positioning solution to track a location of Electronic device 204 relative to the known locations of the smart TVs that are represented by Smart TV GUI element 208 and Smart TV GUI element 304. The position of Smart TV GUI element 208 and Smart TV GUI element 304 are caused to move within the Main Pane 218 as the Electronic device 204 moves relative to the physical Smart TVs. Distance indicators 308 (such as range circles) can be displayed on Main Pane 218 to indicate relative distances from the Electronic device 204 to each of the represented smart TVs. Lines 302 and 306 represent movement of the Smart TV GUI element 208 within the Main Pane 218 in response to movement of the Electronic device 204. In the illustrated example, Electronic device 204 is located nearer to the smart TV represented by Smart TV GUI element 208 than the smart TV represented by Smart TV GUI element 304.

In the illustrated example, the User 206 desires to turn on the smart TV that they are the closest to as the user is moving within a room in their home. The User 206 looks at the Display 118 such that their Gaze Direction 214 tracks the Smart TV GUI element 208 as it moves in the display space 224 in response to movement of the Electronic device 204, and simultaneously issues voice command "turn on". Gaze Tracker 122 generates real-time gaze data (e.g., estimated real-time User's Point of Gaze 216 and/or corresponding gaze region 202 information). Simultaneously, Speech-To-Text Conversion 124 extracts the command "turn on" from the user speech input 222. The extracted text and real-time gaze data are provided to Gaze/Speech Combiner 128 for processing. In an example implementations, Gaze/Speech Combiner 128 identifies, based on the real-time gaze data, that the moving Smart TV GUI element 208 is the subject of the user's Point of Gaze 216 coincident with the spoken command "turn on". As a result, Gaze/Speech Combiner 128 resolves the command "turn on" to the particular smart TV that is represented by Smart TV GUI element 208 and causes a "turn on" command to be communicated to that particular smart TV (as opposed to the smart TV that is represented by Smart TV GUI element 304).

Accordingly, in example embodiments, the Electronic device 204 is configured to use real-time gaze tracking to associate a voice command with a moving display element within the display space 224 and then direct the content of such command to a further electronic device that is represented by the moving display element.

Figure 4:
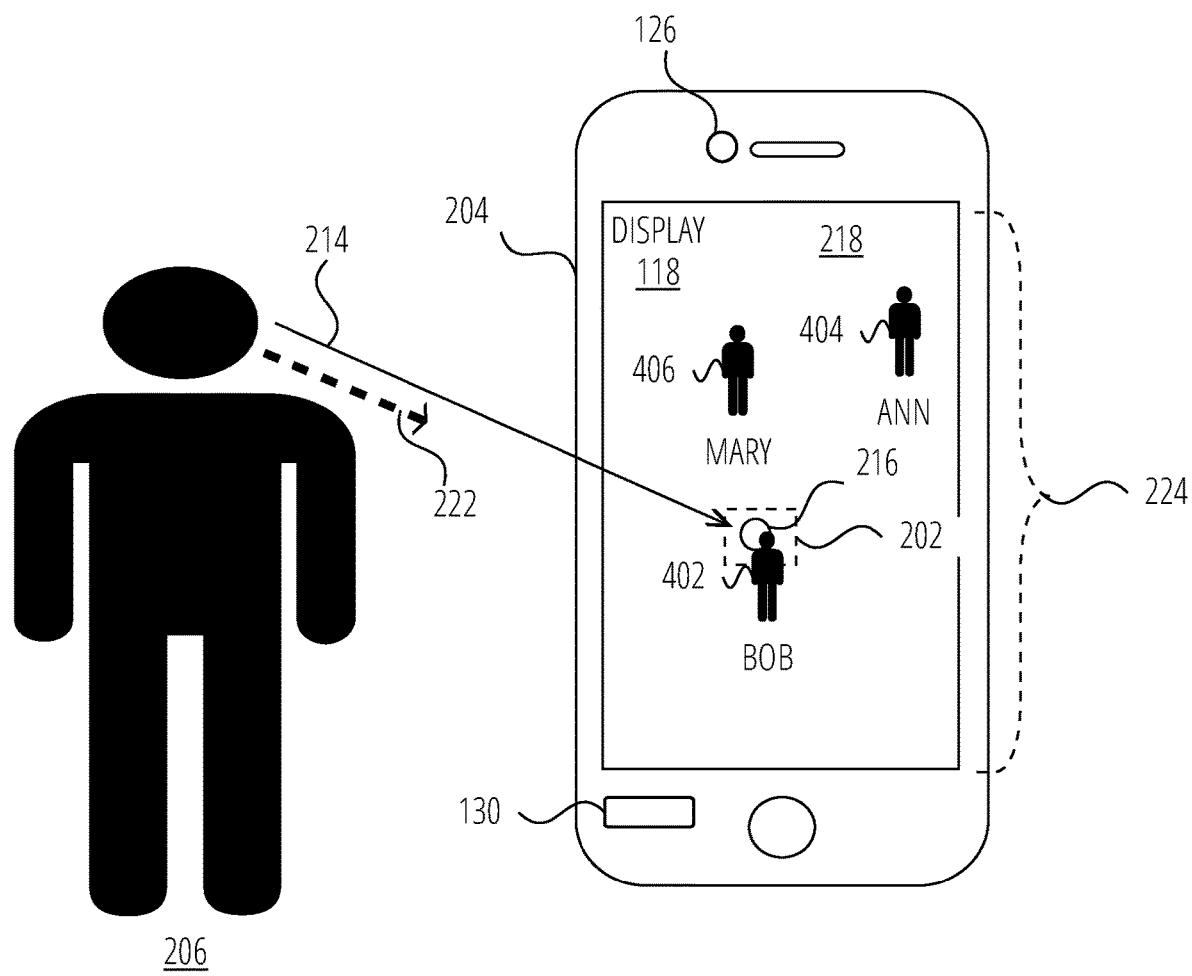
FIG. 4 illustrates a further example of a gaze-assisted input event for directing a speech input to a remote device that is represented by a moving display element in a display space in accordance with one embodiment.

FIG. 4 illustrates another example of gaze based directing of speech input 222 based content to a further electronic device that is presented in a display space 224. In the example of FIG. 4, an application 120 running on the Electronic device 204 includes the ability to receive location data in respect of a plurality of remote location tracking enabled electronic devices that can be moving relative to the location of the Electronic device 204. For example, each of the remote electronic devices may send GPS location data to a cloud based service that in turn provides location information via a Network Interface 108 to Electronic device 204. Electronic device 204 in turn displays a respective GUI element 402, 404, 406 for each respective remote electronic device, with locations of the GUI elements in display space 224 representing respective geographic locations of the remote Electronic devices 204. By way of example, the GUI elements 402, 404, 406 may be overlaid on a regional map display (for example a city map), with the GUI elements 402, 404, 406 shown at the map locations that correspond to the actual real-time (or periodically updated) locations of the remote electronic devices that they represent. In the illustrated examples, the remote Electronic devices 204, which may be moving, is enabled to receive communications based on speech input 222 provided by User 206. Remote electronic devices could for example be smart phones that are pre-registered along with user's Electronic device 204 as part of a friend or work messaging platform. In some examples, remote electronic devices could include smart tags or similar geo-location tracked devices that can receive messages or commands that originate from user's Electronic device 204 (e.g., commands that cause the remote electronic device to shut down or otherwise control an associated device, to sound an alarm, or increase frequency of GPS location reporting, or enter or exit a sleep mode).

In an example scenario, the User 206 provides a speech input 222 while their Gaze Direction 214 tracks one of the display elements (for example, GUI element 402), Gaze Tracker 122 generates real-time gaze data (e.g., estimated real-time User's Point of Gaze 216 and/or corresponding gaze region 202 information). Simultaneously, Speech-To-Text Conversion 124 extracts text content from the speech input 222. The extracted text and real-time gaze data are provided to Gaze/Speech Combiner 128 for processing. In an example implementations, Gaze/Speech Combiner 128 identifies, based on the real-time gaze data, that the GUI element 402 is the subject of the user's Point of Gaze 216 that coincides with speech input 222. As a result, Gaze/Speech Combiner 128 resolves the content of the speech input 222 to the particular remote electronic device that is represented by GUI element 402 and causes a message or command that is based the extracted text to be communicated for that particular remote electronic device. For example, the speech input and corresponding extracted text could be "meet me at 6 PM at the place", which is then sent to the intended recipient (as determined by gaze tracking) as a text message.

As described above, FIGS. 3 and 4 provide examples of implementations in which a GUI element is caused to move in the display space in response to motion of one or both of the further device or the first electronic device. Accordingly, it will be appreciated that in some implementations, a GUI element is positioned on a screen (e.g., display space) to reflect the real location of a further device relative to the user's Electronic device 204. Any relative movement in either the user's Electronic device 204, or the further device then causes a resultant movement of the GUI element. This could implementation could for example be used in a mapping application that updates one or more items displayed in a display space as the user's Electronic device 204 is rotated, thereby providing a real-time representation of relative device and item locations in the actual world; e.g. items on the GUI move as the user's Electronic device 204 is rotated relative to the real world.

In a further example, a local positioning system provides the locations of devices relative to the user's Electronic device 204 on a radar-like interface, as the user's Electronic device 204 moves relative to these devices, the icons representing them also move on the GUI.

Figure 5:
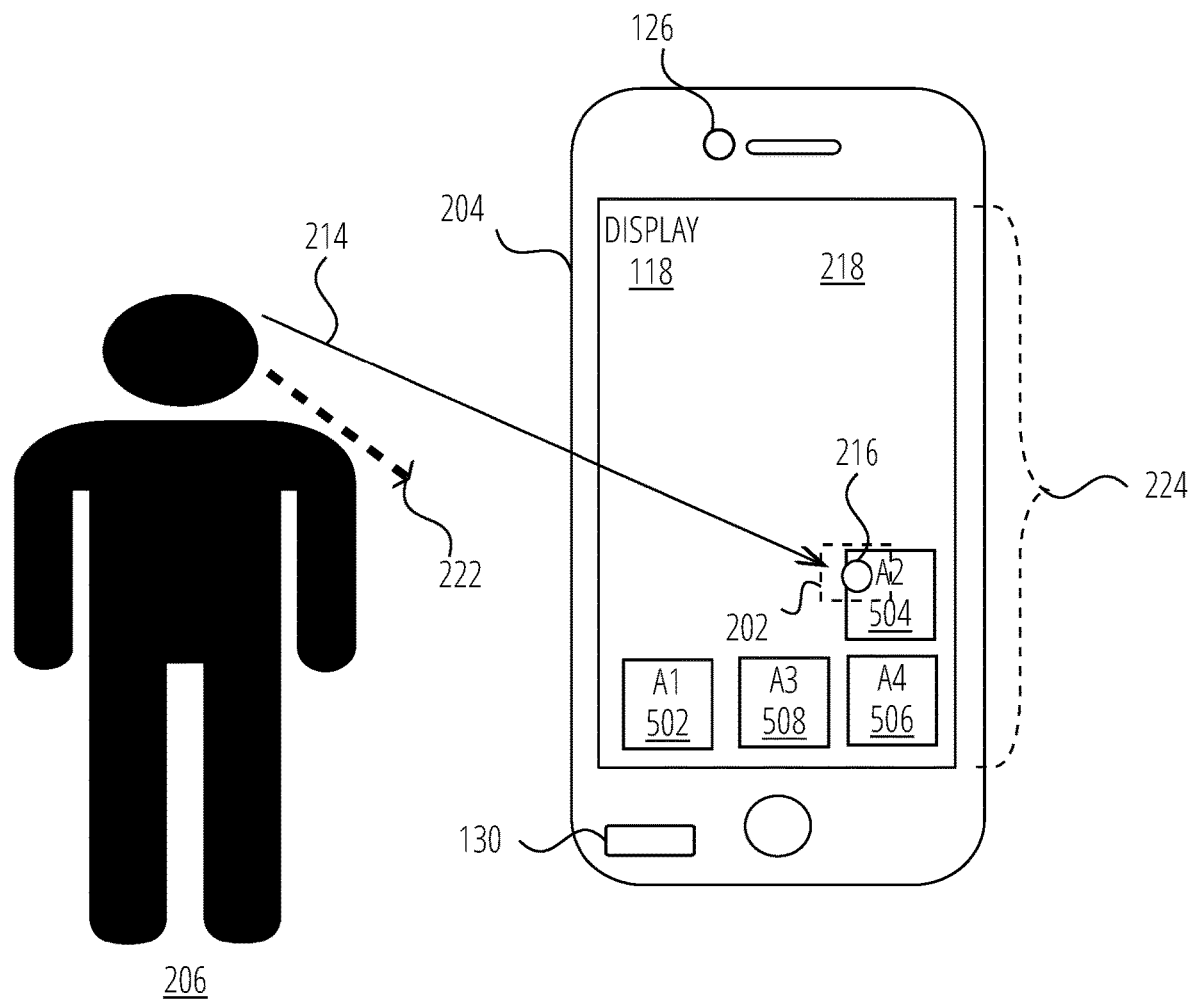
FIG. 5 illustrates an example of a gaze-assisted input event for directing a speech input to an application that is represented by a display element in a display space in accordance with one embodiment.

FIG. 5 illustrates a further example embodiment in which Gaze Direction 214 can be used to direct content extracted from a speech input 222 to a specific application. In the example of FIG. 5, Operating System 112 causes a plurality of display elements to be displayed in respective sub-regions of display space 224 as part of a Main Pane 218. Each of the display elements can, for example be a respective GUI application icon that represents a respective application 120. For example, icon 502 represents a first application A1; icon 504 represents a second application A2; icon 508 represents a third application A3; and icon 506 represents a fourth application A4. In a manner similar to that described above, the Gaze Tracker 122, Speech-To-Text Conversion 124 and Gaze/Speech Combiner 128 collectively operate to resolve content extracted from speech input 222 to a specific icon 502, 504, 508, 506 based on real-time tracking of a Point of Gaze 216 coinciding with the speech input 222. Electronic device 204 then causes the extracted content to be directed to the application that is represented by the specific icon. In some examples, the represented applications can be executed solely on the Electronic device 204, for example a calculator application. In some examples, the represented applications can be client-side application components of APIs for accessing remotely hosted services.

In a first illustrated example, application icon 504 represents a client side of a cloud based service application program interface (API), for example a search engine such as Safari™ or Google™ or a AI-based prompt-response service such as ChatGPT™. User 206 desires to issue a text search input or prompt to the service that corresponds to the application represented by the application icon 504. The User 206 looks at the Display 118 such that their Gaze Direction 214 is focused on application icon 504, and simultaneously provides a speech input 222 that includes search query or prompt (e.g., "Explain black holes in common language"). Gaze Tracker 122 generates real-time gaze data (e.g., estimated real-time User's Point of Gaze 216 and/or corresponding gaze region 202 information). Simultaneously, Speech-To-Text Conversion 124 extracts the text of the search query or prompt from the user speech input 222. The extracted text and real-time gaze data are provided to Gaze/Speech Combiner 128 for processing. In an example implementations, Gaze/Speech Combiner 128 identifies, based on the real-time gaze data, that the application icon 504 is the subject of the user's Point of Gaze 216 coincident with the speech input 222. As a result, Gaze/Speech Combiner 128 resolves that the extracted text is intended for the application A2 represented by the application icon 504 and passes the extracted text to application A2, which in turn automatically sends the extracted text as a search query or prompt to the remotely hosted service that corresponds to application A2. In at least some examples, the Electronic device 204 will also automatically cause application A2 to be opened in a further window or pane the display space 224 such as to enable the response received from the remotely hosted service to be displayed in the display space 224.

In a second illustrated example, application icon 502 represents a calculator application A1 that is present on Electronic device 204. User 206 desires to know the answer to a math problem, e.g., "112 multiplied by 26". The User 206 looks at the Display 118 such that their Gaze Direction 214 is focused on calculator application icon 502, and simultaneously provides a speech input 222 that includes the math problem (e.g., "112 multiplied by 26"). Gaze Tracker 122 generates real-time gaze data (e.g., estimated real-time User's Point of Gaze 216 and/or corresponding gaze region 202 information). Simultaneously, Speech-To-Text Conversion 124 extracts the text of the math problem (e.g., "112× 26") from the speech input 222. The extracted text and real-time gaze data are provided to Gaze/Speech Combiner 128 for processing. In an example implementations, Gaze/Speech Combiner 128 identifies, based on the real-time gaze data, that the calculator application icon 504 is the subject of the user's Point of Gaze 216 coincident with the speech input 222. As a result, Gaze/Speech Combiner 128 resolves that the extracted text is intended for the application A1 represented by the application icon 504 and passes the extracted text to calculation application A1, which in turn automatically performs the calculation. The Electronic device 204 will also automatically cause application A1 to be opened in a further window or pane the display space 224 such as to enable the calculated answer to be displayed in the display space 224.

Thus, in the example of FIG. 5, the Electronic device 204 resolves the target of speech inputs at the application level through gaze tracking. The resulting text from the speech input is provided to the target application, enabling a hands-free method of querying applications, among other things. In such an implementation, text is extracted from speech and automatically provided text for processing by the target application. In some examples, the following steps are performed: a) determining if the extracted speech corresponds to a command associated with the gaze targeted application; b) converting the extracted speech to an input compatible with an API associated with the application; and c) providing the input to the API for execution of the command by the application. Illustrative examples can include: looking at an app icon representing an App Store and saying "drawing", which is then is interpreted as a desire for search for a downloadable drawing application; and looking at a reminder App icon and saying: "pick up milk later", which results in an creation of a corresponding reminder event.

Figure 6:
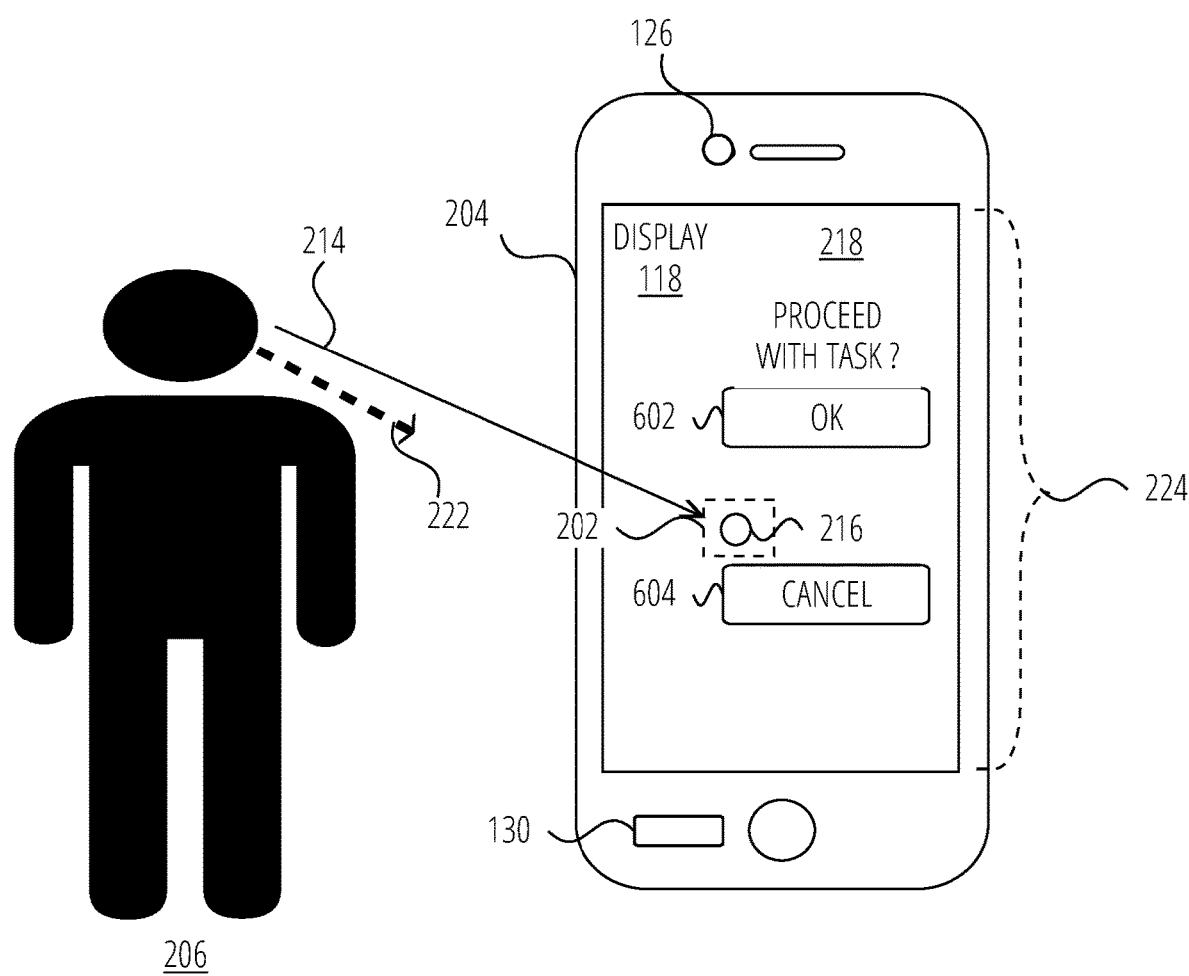
FIG. 6 illustrates an example of a gaze-assisted input event for confirming a speech input made in respect of a display element in a display space in accordance with one embodiment.

FIG. 6 illustrates another example of gaze-assisted speech input. In the example of FIG. 6, the main pane 218 shown in display space 224 displays a plurality of user selectable display elements in the form of buttons 602 and 604. Buttons 602 and 604 each occupy a respective sub-region of display space 224, and each button represents a specific command for an application that is running on the Electronic device 204. As illustrated in FIG. 6, each Button 602 and 604 includes visible indicia that indicates a meaning that is associated with the button, for example "OK" in the case of button 602 and "CANCEL" in the case of button 604. In the example of FIG. 6, Gaze/Speech Combiner 128 is configured to resolve a speech input 222 to a particular display element and cause a corresponding action to be taken when two conditions are met. First, the gaze data must map to a button coincident with the speech input 222. Second, the text command extracted from the speech input 222 must match the meaning of the indicia of the button that the Point of Gaze 216 is mapped to.

In the illustrated example of FIG. 6, User 206 is presented with two display elements representing different command options for an underlying applications, namely "OK" button 602 and "Cancel" button 604. In an example scenario, User 206 desires to input an "OK" command, represented by button 602, to proceed with a task. The User 206 looks at the Display 118 such that their Gaze Direction 214 is focused on "OK" button 602, and simultaneously provides a speech input 222 that includes "OK". Gaze Tracker 122 generates real-time gaze data (e.g., estimated real-time User's Point of Gaze 216 and/or corresponding gaze region 202 information). Simultaneously, Speech-To-Text Conversion 124 extracts the command "OK" from the speech input 222. The extracted text and real-time gaze data are provided to Gaze/Speech Combiner 128 for processing. In an example implementations, Gaze/Speech Combiner 128 identifies, based on the real-time gaze data, that the "OK" button 602 is the subject of the user's Point of Gaze 216 coincident with the speech input 222. Furthermore, Gaze/Speech Combiner 128 confirms that the command "OK" matches the meaning of the indicia displayed with the "OK" button 602. Based on these two conditions being met, the "OK" command is provided to the underlying application for execution.

Accordingly, in the example of example of FIG. 6, Electronic device 204 can resolve ambiguity that can occur in point of gaze tracking when giving speech commands in respect of display elements that are represented in small display space sub-regions. In particular, the spoken command must match pre-defined criteria (e.g., a displayed indicia such as text) associated with the display element that is the subject of a point of gaze in order for the command to be executed. The contextualization of speech input with point of gaze and vice versa further removes ambiguity in the unitary inputs (gaze or speech), for example, when looking at and speaking a command button. This reduces errors with small targets such as buttons.

Accordingly, FIG. 6 shows an example in which a gaze-targeted display element includes indicia indicating a meaning. A command is extracted from speech input, and an action is automatically performed only when the extracted command matches the meaning indicated by the indicia. Further examples can include: sending a message that has been entered into a messaging application when a "send" button is the subject of a point of gaze and the speech input is "send"; and "deleting" selected or specified content from a text entry interface when a "delete" button is the subject of a point of gaze and the speech input is "delete".

Figure 7:
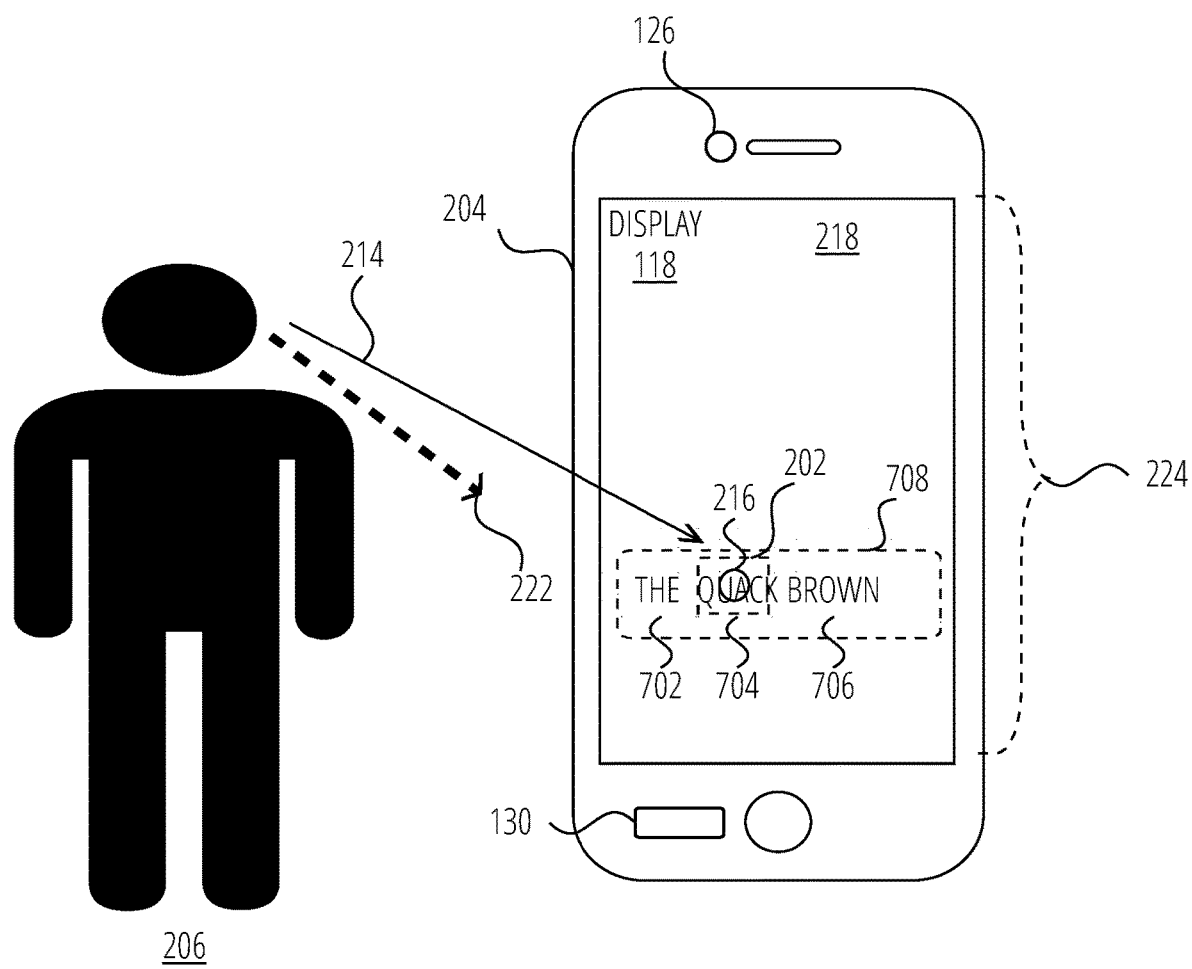
FIG. 7 illustrates an example of a gaze-assisted input event for correcting an error in accordance with one embodiment.

FIG. 7 illustrates yet a further example of a gaze-assisted input event according to example embodiments. In illustrated example, Gaze Direction 214 can be used to select an erroneous text entry that is displayed in a display space, and speech input 222 of replacement text entry received to replace the erroneous text entry.

By way of example, in FIG. 7, Main Pane 218 displays text that is being input by user through speech or other means for an application 120. For example the application may be a messaging application and the input text is part of a text message. In the illustrated example, the input text is displayed in a text input region or field 708 that is displayed in display space 224. The displayed text includes a plurality of discrete display elements in the form of words 702, 704, 706. Each word 702, 704, 706 occupies a respective sub-region of the display space 224. In the illustrated example, the word 704 ("QUACK") is erroneous and requires correction. Accordingly, User 206 directs their Gaze Direction 214 towards word 704 ("QUACK") and provides a speech inputs 222 that includes a replacement word (for example, "QUICK"). Gaze Tracker 122 generates real-time gaze data (e.g., estimated real-time User's Point of Gaze 216 and/or corresponding gaze region 202 information). Simultaneously, Speech-To-Text Conversion 124 extracts the replacement word "QUICK" from the speech input 222. The extracted text and real-time gaze data are provided to Gaze/Speech Combiner 128 for processing. In an example implementations, Gaze/Speech Combiner 128 identifies, based on the real-time gaze data, that the word 704 ("QUACK") is the subject of the user's Point of Gaze 216 coincident with the speech input 222 of replacement word "QUICK". A resulting action is performed whereby the erroneous word 704 ("QUACK") is replaced in the text input field 708 with the spoken replacement word "QUICK".

In the illustrated example, speech input can be used to correct error in word inputs by allowing edits through gaze-assisted speech input. Rather than resorting to a touch keyboard to correct dictation errors, which defeats the use of dictation as a hands-free method, gaze data used to indicate an erroneous speech detection and speech input is used to correct it.

Figure 8:
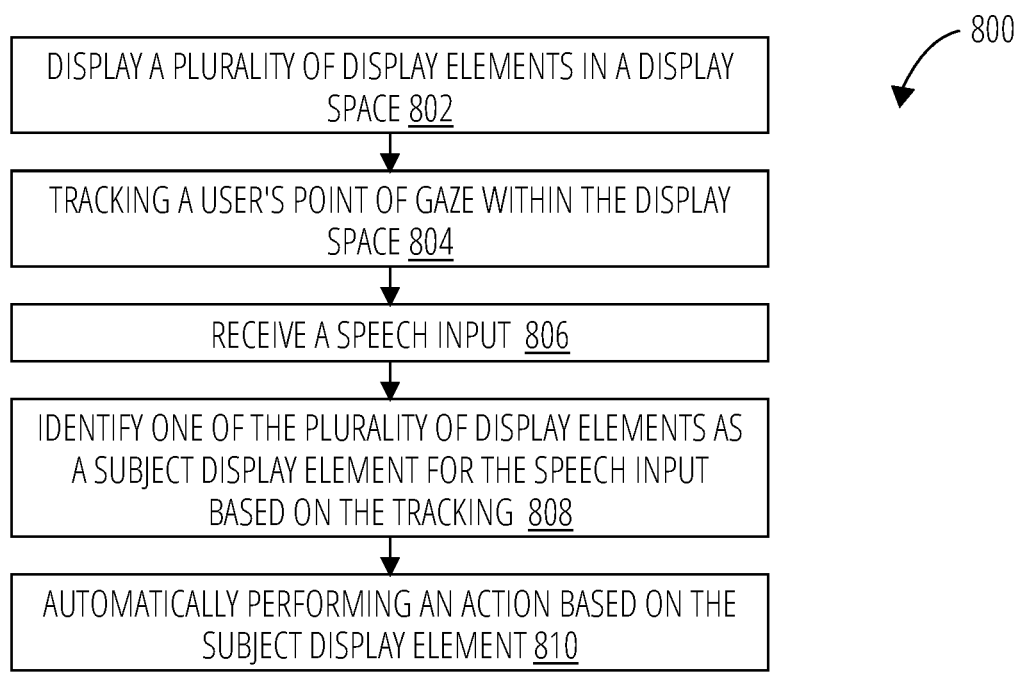
FIG. 8 illustrates a routine 800 in accordance with one embodiment.

FIG. 8 illustrates an overview of a routine 800 that can be performed by an electronic device 102 in order to implement one or more of the examples described above in respect of FIGS. 2 to 7. In block 802, routine 800 displays a plurality of display elements in a display space. In block 804, routine 800 tracks a user's point of gaze within the display space. In block 806, routine 800 receives a speech input. In block 808, routine 800 identifies one of the plurality of display elements as a subject display element for the speech input based on the tracking. In block 810, routine 800 automatically performs an action based on the subject display element.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all publications referenced in this disclosure are incorporated by reference.

The terms "substantially" and "approximately" as used in this disclosure mean that the recited characteristic, parameter, or value need not be achieved exactly, but that deviations or variations including for example, tolerances, measurement error measurement accuracy limitations and other factors known to those skilled in the art, may occur in amounts that do not preclude the effect the characteristic was intended to provide. In some examples, the terms "substantially" and "approximately", can mean a range of within 10% of the stated characteristic.

What is claimed is:

1. A computer implemented method comprising:
   displaying a plurality of display elements in a display space;
   tracking a user's point of gaze within the display space by determining coordinates for the user's point of gaze within a coordinate system of the display space;
   determining a gaze region within the display space based on the determined coordinates for the user's point of gaze, wherein the gaze region encompasses the user's point of gaze and a surrounding region of the display space;
   receiving a speech input;
   identifying one of the plurality of display elements as a subject display element for the speech input based on a predetermined minimum threshold spatial overlap between the gaze region and a sub-region of the display space occupied by the subject display element for a predetermined minimum threshold time during the speech input; and
   automatically performing an action based on the subject display element and the speech input.

2. The method of claim 1 wherein the method is performed by a first electronic device and the subject display element is a GUI element that represents a further device that is associated with the first electronic device, the method comprising:
   extracting a command from the speech input, and
   wherein automatically performing the action comprises transmitting the command, using a network interface of the first electronic device, for processing by the further device.

3. The method of claim 2, further comprising causing the GUI element to move in the display space in response to motion of one or both of the further device or the first electronic device.

4. The method of claim 1 wherein the subject display element corresponds to an application, the method comprising:
   extracting text from the speech input, and
   wherein automatically performing the action comprises providing the extracted text for processing by the application.

5. The method of claim 1 wherein the subject display element corresponds to a remotely hosted service, the method comprising:
   extracting a text search query or text prompt from the speech input, and
   wherein automatically performing the action comprises automatically providing the extracted text search query or text prompt via a communication network to the remotely hosted service and receiving a corresponding response from the remotely hosted service.

6. The method of claim 1 wherein the subject display element corresponds to a word displayed in a text display field, the method comprising:
   extracting a replacement word from the speech input, and
   wherein automatically performing the action comprises replacing the word displayed in the text display field with the replacement word or phrase.

7. The method of claim 1 wherein the subject display element includes indicia indicating a meaning, the method comprising:
- extracting a command from the speech input, and
- wherein automatically performing the action comprises comparing the extracted command to the meaning indicated by the indicia and causing an activity corresponding to the extracted command to be performed only when the extracted command matches the meaning indicated by the indicia.

8. A computing system comprising:
one or more processors; and
one or more memories storing instructions that, when executed by the one or more processors, configure the computing system to:
- display a plurality of display elements in a display space;
- track a user's point of gaze within the display space by determining coordinates for the user's point of gaze within a coordinate system of the display space;
- determine a gaze region within the display space based on the determined coordinates for the user's point of gaze, wherein the gaze region encompasses the user's point of gaze and a surrounding region of the display space;
- receive a speech input;
- identify one of the plurality of display elements as a subject display element for the speech input based on a predetermined minimum threshold spatial overlap between the gaze region and a sub-region of the display space occupied by the subject display element for a predetermined minimum threshold time during the speech input; and
- automatically perform an action based on the subject display element and the speech input.

9. The computing system of claim 8 wherein the subject display element is a GUI element that represents a further device that is associated with the computing system, the computing system being configured to:
- extract a command from the speech input, and
- wherein automatically performing the action comprises transmitting the command, using a network interface of the computing system, for processing by the further device.

10. The computing system of claim 8 wherein the subject display element corresponds to an application, the computing system being configured to:
- extract text from the speech input, and
- wherein automatically performing the action comprises providing the extracted text for processing by the application.

11. The computing system of claim 8 wherein the subject display element corresponds to a remotely hosted service, the computing system being configured to:
- extract a text search query or text prompt from the speech input, and wherein automatically performing the action comprises automatically providing the extracted text search query or text prompt via a communication network to the remotely hosted service and receiving a corresponding response from the remotely hosted service.

12. The computing system of claim 8 wherein the subject display element corresponds to a word displayed in a text display field, the computing system being configured to:
- extract a replacement word from the speech input, and
- wherein automatically performing the action comprises replacing the word displayed in the text display field with the replacement word or phrase.

13. The computing system of claim 8 wherein the subject display element includes indicia indicating a meaning, the computing system being configured to:
- extract a command from the speech input, and
- wherein automatically performing the action comprises comparing the extracted command to the meaning indicated by the indicia and causing an activity corresponding to the extracted command to be performed only when the extracted command matches the meaning indicated by the indicia.

14. A non-transitory computer-readable storage medium, the computer-readable storage medium including instructions that when executed by a computing system, cause the computing system to:
- display a plurality of display elements in a display space;
- track a user's point of gaze within the display space by determining coordinates for the user's point of gaze within a coordinate system of the display space;
- determine a gaze region within the display space based on the determined coordinates for the user's point of gaze, wherein the gaze region encompasses the user's point of gaze and a surrounding region of the display space;
- receive a speech input;
- identify one of the plurality of display elements as a subject display element for the speech input based on a predetermined minimum threshold spatial overlap between the gaze region and a sub-region of the display space occupied by the subject display element for a predetermined minimum threshold time during the speech input; and
- automatically perform an action based on the subject display element and the speech input.

15. The method of claim 1, wherein the predetermined minimum threshold spatial overlap represents at least a percentage of overlap between the gaze region and the sub-region of the display space occupied by the subject display element for at least a percentage of the time duration of the speech input.

16. The method of claim 1, wherein the predetermined minimum threshold spatial overlap represents at least 70% of overlap between the gaze region and the sub-region of the display space occupied by the subject display element for at least 50% of the time duration of the speech input.

17. The method of claim 1, further comprising identifying the one of the plurality of display elements as the subject display element based on an extracted content of the speech input.

18. The computing system of claim 8, wherein the predetermined minimum threshold spatial overlap represents at least a percentage of overlap between the gaze region and the sub-region of the display space occupied by the subject display element for at least a percentage of the time duration of the speech input.

19. The computing system of claim 8, wherein the predetermined minimum threshold spatial overlap represents at least 70% of overlap between the gaze region and the sub-region of the display space occupied by the subject display element for at least 50% of the time duration of the speech input.

20. The computing system of claim 8, the computing system being configured to:
- identify the one of the plurality of display elements as the subject display element based on an extracted content of the speech input.

* * * * *